United States Patent [19]

Sasanoi

[11] Patent Number: 5,435,636

[45] Date of Patent: Jul. 25, 1995

[54] ANTISKID BRAKE APPARATUS FOR VEHICLE

[75] Inventor: Michihisa Sasanoi, Hamamatsu, Japan

[73] Assignee: Suzuki Kabushiki Kaisha, Japan

[21] Appl. No.: 160,838

[22] Filed: Dec. 3, 1993

[30] Foreign Application Priority Data

Apr. 30, 1993 [JP] Japan .................................. 5-104348
May 13, 1993 [JP] Japan .................................. 5-111715

[51] Int. Cl.⁶ .............................................. B60T 8/32
[52] U.S. Cl. ................................ 303/116.1; 303/115.4; 303/119.1; 303/117.1
[58] Field of Search .............. 303/116.1, 116.2, 115.4, 303/115.5, 110, 105, 113.1, 68–69, 115.1, 117.1, 119.1, 901, DIG. 1, DIG. 2, 92, 113.4, 114.1, 87, 10–12, 116.3, 116.4, 113.2, 113.3

[56] References Cited

U.S. PATENT DOCUMENTS

| | | | |
|---|---|---|---|
| 4,629,258 | 12/1986 | Resch et al. | 303/114.1 |
| 4,715,667 | 12/1987 | Otsuki et al. | 303/68 X |
| 4,936,637 | 6/1990 | Adachi et al. | 303/115.4 |
| 5,013,097 | 5/1991 | Gutzeit et al. | 303/DIG. 2 |
| 5,094,511 | 3/1992 | Becker et al. | 303/68 X |
| 5,180,216 | 1/1993 | Kirstein | 303/116.2 X |
| 5,207,485 | 5/1993 | Troster | 303/116.1 X |
| 5,281,010 | 1/1994 | Brown | 303/115.5 X |
| 5,288,142 | 2/1994 | Burgdorf | 303/116.2 X |
| 5,290,098 | 3/1994 | Burgdorf et al. | 303/119.1 X |

FOREIGN PATENT DOCUMENTS

| | | |
|---|---|---|
| 0443591 | 8/1991 | European Pat. Off. . |
| 0512239 | 11/1992 | European Pat. Off. . |
| 4023706 | 1/1992 | Germany . |
| 4030871 | 4/1992 | Germany ............... 303/116.1 |
| 4111165 | 10/1992 | Germany . |
| 58-4658 | 1/1983 | Japan .................... 303/115.4 |
| 2036222 | 6/1980 | United Kingdom ....... 303/116.1 |

*Primary Examiner*—Douglas C. Butler
*Attorney, Agent, or Firm*—Ronald P. Kananen

[57] ABSTRACT

An antiskid brake apparatus for a vehicle comprises a braking mechanism for braking wheels of a vehicle, a master cylinder assembly operated in response to a brake operation force and adapted to brake the wheels through the braking mechanism, a sensor for detecting a rotating speed of the wheels, a direction control valve disposed on a fluid passage connecting the master cylinder assembly and the braking mechanism, a pressure reducing cylinder assembly which is operatively connected to the direction control valve, a pump unit connected through a fluid passage between the master cylinder assembly and the pressure reducing cylinder assembly for returning the hydraulic oil from the pressure reducing cylinder assembly to the master cylinder assembly, and a control unit for detecting a sign of locking of the wheels in accordance with an input from the sensor. The pressure reducing cylinder assembly has a capacity smaller than a hydraulic oil discharge capacity corresponding to a full stroke of the master cylinder assembly. A pressure cut valve is further connected to the master cylinder assembly and the pump unit through fluid passages for cutting a pump pressure of the pump unit with respect to the master cylinder assembly and the pressure cut valve is operatively connected to the braking mechanism through a fluid passage.

5 Claims, 4 Drawing Sheets

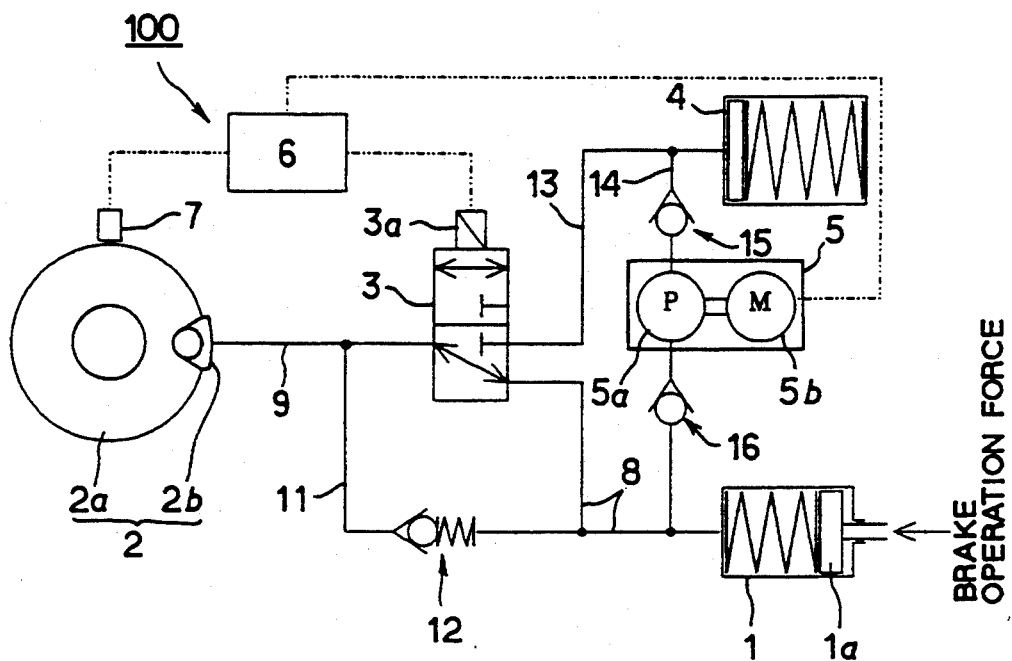
FIG. 6A
PRIOR ART
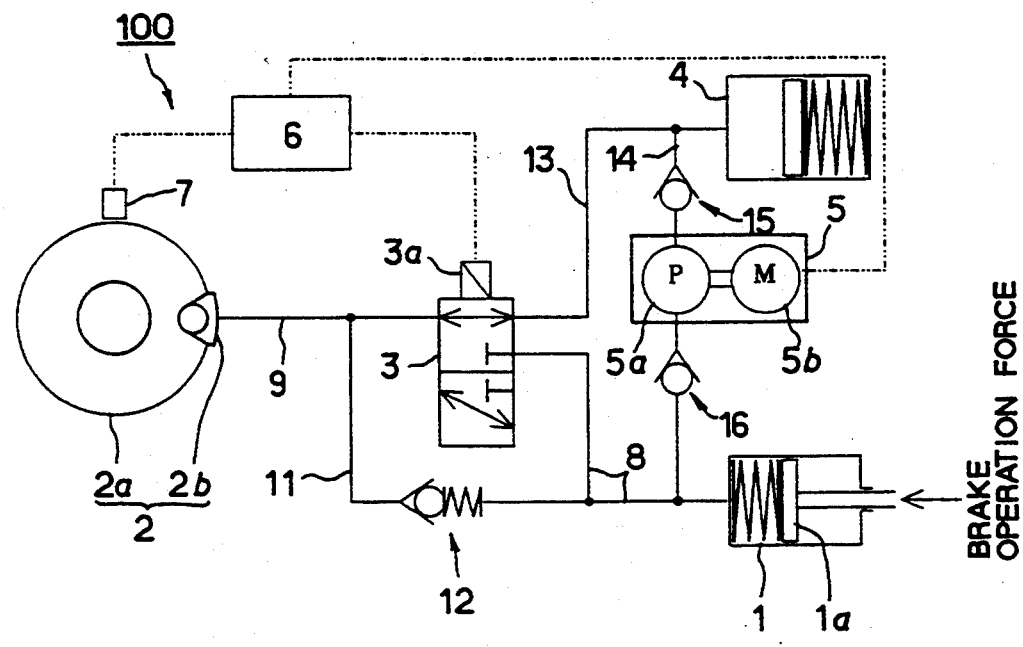
FIG. 6B
PRIOR ART
FIG. 6

ANTISKID BRAKE APPARATUS FOR VEHICLE

BACKGROUND OF THE INVENTION

The present invention relates to an antiskid braking apparatus for a vehicle for preventing locking of wheels of a vehicle at the time of, for example, rapid braking.

FIGS. 6A and 6B are structural views which illustrate a usual antiskid braking apparatus for use in an automobile or a motorcycle. The antiskid braking apparatus 100 comprises a master cylinder 1, a braking mechanism 2 for braking the rotations of wheels, a direction control valve 3, a pressure reducing valve 4, a pump unit 5, a control means 6 and a wheel-speed sensor 7 for detecting the rotational speed of the wheels.

When braking force is applied to the master cylinder 1 from a brake pedal or a brake lever, an internal piston 1a disposed in the master cylinder 1 is pushed in as shown in FIG. 6B so that hydraulic oil (brake fluid) enclosed in the master cylinder 1 is discharged. On the other hand, the braking mechanism 2 comprises a disc rotor 2a so formed as to be integrally rotated with the wheel and a brake caliper 2b holding the disc rotor 2a.

The master cylinder 1 is connected to the direction control valve 3 via a fluid passage 8, the direction control valve 3 being connected to the brake caliper 2b via a fluid passage 9. The fluid passage 8 and the fluid passage 9 are connected to each other by a fluid passage 11. A check valve 12 for permitting only a flow of the hydraulic oil that returns from the brake caliper 2b to the master cylinder 1 is connected to an intermediate position in the fluid passage 11.

The pressure reducing valve 4 is connected to the direction control valve 3 via a fluid passage 13. The fluid passage 13 and the fluid passage 8 are connected to each other through a fluid passage 14. The pump unit 5 includes a pump 5a connected to an intermediate position of the fluid passage 14. Check valves 15 and 16 for permitting only flow of the hydraulic oil that returns from the pressure reducing cylinder 4 to the master cylinder 1 are connected to the upstream and downstream sides of the pump 5a with respect to the flow of the fluid. The pump unit 5 is also equipped with a motor 5b for operating the pump 5a.

The control means 6 is wired to a solenoid 3a for operating the direction control valve 3, the motor 5b and the wheel-speed sensor 7.

When the brake pedal or the brake lever of a vehicle is operated in the state shown in FIG. 6A, the hydraulic oil in the master cylinder 1 is, under pressure, fed to the brake caliper 2b via the fluid passage 8 and the fluid passable 9. The hydraulic pressure causes the brake caliper 2b to hold the disc rotor 2a so as to brake the rotations of the wheels.

When the brake pedal or the brake lever is released, the hydraulic oil fed to the brake caliper 2b returns through the fluid passage 9 and the fluid passage 8 to be again charged into the master cylinder 1 so that the hydraulic pressure is applied to the brake caliper 2b, thus releasing the braking of the wheels.

At the time of rapid braking or braking on a road on which slippage easily takes place, the possibility of locking of the wheels is raised in proportion to the braking force. In such a case, the control means 6 detects a sign of locking of the wheels in response to an input from the foregoing wheel-speed sensor 7 and, if the sign is detected, operates the solenoid 3a to operate the direction control valve 3 from a state shown in FIG. 6A to a state shown in FIG. 6B.

As a result, the fluid passage 8 is closed so that the hydraulic oil in the master cylinder 1 is not sent to the brake caliper 2b. Further, the fluid passage 9 and the fluid passage 13 are communicated with each other so that the hydraulic pressure applied to the brake caliper 2b is relieved to the pressure reducing cylinder 4. As a result, the hydraulic oil is accumulated in the pressure reducing cylinder 4, and then, the force of the brake caliper 2b to hold the disc rotor 2a is relaxed and locking of the wheels is prevented. The hydraulic oil accumulated in the pressure reducing cylinder 4 is returned to the master cylinder 1 by the operation performed by the pump unit 5 so that the piston 1a of the master cylinder 1 is pushed back.

If the sign of locking of the wheels has disappeared, the control means 6 operates to immediately return the direction control valve 3 from the state shown in FIG. 6B to the state shown in FIG. 6A. Therefore, the hydraulic oil discharged from the master cylinder 1 is again fed to the brake caliper 2b so that the brake caliper 2b brakes the rotations of the wheels.

The foregoing operation is quickly repeated (called antiskid operation) so that strong braking force can be obtained while preventing locking of the wheels. As a result, the vehicle can safely be stopped in the shortest distance.

In the antiskid braking apparatus 100 having a structure as described above, if the pump unit 5 is broken down and the hydraulic oil accumulated in the pressure reducing cylinder 4 cannot therefore be returned to the master cylinder 1, it will be considered to employ a case in which the control means 6 detects the failure to continue raising/lowering of the hydraulic pressure applied to the brake caliper 2b until the hydraulic oil in the master cylinder 1 is completely fed to the pressure reducing cylinder 4 or to immediately stop the operation and perform an operation as performed by a usual braking apparatus.

If the raising/lowering of the hydraulic pressure applied to the brake caliper 2b is continued until the hydraulic oil in the master cylinder 1 is completely fed to the pressure reducing cylinder 4 as described above, there are advantages that the antiskid effect can be obtained for a while if the pump unit 5 has been broken down and a driver of a vehicle is able to instantaneously recognize the occurrence of the failure because the stroke of the brake pedal or the brake lever is rapidly lengthened.

However, the fact that the conventional structure has such an arrangement as that the capacity of the pressure reducing cylinder 4 is made larger than the hydraulic pressure discharge capacity which is realized by the full stroke of the master cylinder 1 causes the piston 1a of the master cylinder 1 to reach the bottom and, hence, no braking force is exhibited from this state if the raising/lowering of the hydraulic pressure to be applied to the brake caliper 2b is continued until the hydraulic oil in the master cylinder 1 is completely fed to the pressure reducing cylinder 4. In order to again obtain the braking force in the foregoing case, the brake pedal must be again depressed or the brake pedal must be again squeezed, thus arising a risk that the braking distance is lengthened.

On the other hand, if the antiskid operation is immediately stopped after the pump unit 5 has been broken down and the operation is performed in a manner similar to that of a usual braking apparatus as described above, the antiskid operation is rapidly stopped during the braking operation with which the antiskid operation is performed. In this case, there is a risk that the wheels are locked too rapidly for the driver of the vehicle to take any countermeasure.

Furthermore, in the antiskid braking apparatus 100, if the operation of the pump unit 5 causes the pump pressure from the pump unit 5 and the manual braking operation force to be simultaneously applied to the master cylinder 1, the pressure in the master cylinder 1 is caused to be raised excessively. As a result, there is a risk that, for example, an oil seal disposed between the master cylinder 1 and the piston 1a is damaged.

Further, the pump pressure from the pump unit 5 intermittently and strongly pushes back the piston 1a of the master cylinder 1, which may lead to a fact that vibration-like kick back is applied on the brake pedal or the brake lever, causing disagreeable operation touch to be created.

SUMMARY OF THE INVENTION

An object of the present invention is to substantially eliminate defects or drawbacks encountered in the prior art and to provide an antiskid braking apparatus for a vehicle with which an antiskid effect can be obtained for a while even if the pump unit has been broken down and which is then able to exhibit the braking force similar to that in a usual braking apparatus without re-operating the brake pedal or the brake lever of a vehicle.

Another object of the present invention is to provide an antiskid braking apparatus for a vehicle capable of preventing the pressure in the master cylinder from being raised excessively at the time of the operation of the pump unit and capable of preventing the application of the kickback to the brake pedal or the brake lever of a vehicle.

These and other objects can be achieved according to the present invention, in one aspect, by providing an antiskid brake apparatus for a vehicle comprising:
  a braking mechanism for braking wheels of a vehicle;
  a master cylinder assembly operated in response to a brake operation force and adapted to brake the wheels through the braking mechanism;
  a sensor for detecting a rotating speed of the wheels;
  a direction control valve disposed on a fluid passage connecting the master cylinder assembly and the braking mechanism;
  a pressure reducing cylinder assembly which is operatively connected to the direction control valve and in which hydraulic oil is accumulated;
  a pump unit connected through a fluid passage between the master cylinder assembly and the pressure reducing cylinder assembly for returning the hydraulic oil from the pressure reducing cylinder assembly to the master cylinder assembly; and
  a control unit for detecting a sign of locking of the wheels in accordance with an input from the sensor, the control unit being operatively connected to the braking mechanism, the direction control valve and the pressure reducing cylinder assembly,
  wherein the pressure reducing cylinder assembly has a capacity smaller than a hydraulic oil discharge capacity corresponding to a full stroke of the master cylinder assembly and the control unit has a structure for operating, if the sign be detected, the direction control valve so as to release a hydraulic pressure applied to the braking mechanism to the pressure reducing cylinder assembly.

In another aspect, there is provided an antiskid brake apparatus for a vehicle comprising:
  a braking mechanism for braking wheels of a vehicle;
  a master cylinder assembly operated in response to a brake operation force and adapted to brake the wheels through the braking mechanism;
  a sensor for detecting a rotating speed of the wheels;
  a direction control valve disposed on a fluid passage connecting the master cylinder assembly and the braking mechanism;
  a pressure reducing cylinder assembly which is operatively connected to the direction control valve and in which a hydraulic oil is accumulated;
  a pump unit connected through a fluid passage between the master cylinder assembly and the pressure reducing cylinder assembly for returning the hydraulic oil from the pressure reducing cylinder assembly to the master cylinder assembly;
  a control unit for detecting a sign of locking of the wheels in accordance with an input from the sensor, the control unit being operatively connected to the braking mechanism, the direction control valve and the pressure reducing cylinder assembly; and
  a pressure cut off valve assembly operatively connected to the master cylinder assembly and the pump unit through fluid passages for cutting a pump pressure of the pump unit with respect to the master cylinder assembly at a time of an operation of the pump unit, the pressure cut off valve assembly being operatively connected to the braking mechanism through a fluid passage.

In a preferred embodiment in this aspect, the pressure cut off valve assembly comprises a cylinder block having an inner hollow portion and a piston member disposed inside the cylinder block to be slidable, the piston member having two end faces receiving pressures from the master cylinder assembly and the pump unit, respectively, the piston member being moved to cut off the fluid passage connected to the pump unit when the pressure from the master cylinder assembly is applied thereto to connect the master cylinder assembly and the braking mechanism to each other only by applying the master cylinder pressure to the braking mechanism and also to cut off the fluid passage connected to the master cylinder assembly when the pressure from the pump unit is applied thereto to connect the pump unit and the braking mechanism to each other only by applying the pump pressure to the braking mechanism.

It is preferred that a first end face of the piston member receiving the pump pressure has an area larger than an area of a second end face of the piston member receiving the master cylinder pressure. The piston member is disposed inside the inner hollow portion of the cylinder block with a space as a first oil chamber between first end face of the piston member and the cylinder block and with a space as a second oil chamber in which a spring member is disposed for urging the piston member to the pump means side, the oil chambers appearing in accordance with the sliding movement of the piston member in the cylinder block.

According to one aspect of the present invention, the antiskid braking apparatus for a vehicle structured as described above is arranged in such a manner that the control means usually relaxes the braking force if the sign of locking of the wheels is detected when braking necessitating the antiskid operation is made at the time of the failure of the pump unit. Therefore, the hydraulic pressure applied to the brake caliper is relieved to the pressure reducing cylinder. As a result, the hydraulic oil is accumulated in the pressure reducing cylinder.

The hydraulic oil accumulated in the pressure reducing cylinder is not returned to the master cylinder because the pump unit is broken down. Therefore, the repetition of raising/lowering the hydraulic pressure to be applied to the brake caliper causes the pressure reducing cylinder to be filled with the hydraulic oil.

Since the capacity of the pressure reducing cylinder is made smaller than the hydraulic pressure discharge capacity which is realized by the full stroke of the master cylinder, the piston of the master cylinder does not reach the bottom even if the pressure reducing cylinder is filled with the hydraulic oil. Therefore, the braking force obtainable from a usual braking apparatus can be exhibited without re-operating of the brake pedal or the brake lever after a moment the pressure reducing cylinder is filled with the hydraulic oil.

In another aspect of the antiskid braking apparatus for a vehicle structured as described above, the pump pressure is, by the pressure cut off valve, cut off with respect to the master cylinder at the time of the operation of the pump unit. Therefore, the simultaneous application of the pump pressure and the manual braking force to the master cylinder is prevented. Therefore, the pressure rise in the master cylinder can be prevented, and therefore, the damage of the oil seal and the like can be prevented. Further, the kickback of the brake pedal or the brake lever is prevented at the time of the operation of the pump unit. As a result, the operation touch can be improved significantly.

Further, if the master cylinder pressure and the pump pressure are simultaneously applied to the pressure cut off valve, the arrangement, which is made in such a manner that the area of the end surface of the piston provided for the pressure cut off valve that receives the pump pressure is made larger than the area of the same that receives the master cylinder pressure, causes the pump pressure to exceed the master cylinder pressure. As a result, the piston is pressed. Therefore, the fluid passage connected to the master cylinder is cut at the time of the operation of the pump unit, causing the pump unit and the braking mechanism to be connected to each other. Hence, the pump pressure is not transmitted to the master cylinder, but the same is transmitted to the braking mechanism. Therefore, the pressure is again applied.

The further nature and features of the present invention will be made more clear from the following descriptions: made with reference to the accompanying drawings.

BRIEF DESCRIPTION OF THE DRAWINGS

In the accompanying drawings:

FIGS. 6A and 6B are diagrams showing a structure of a conventional antiskid braking apparatus, in which FIG. 6A illustrates a state where no sign of locking of the wheels is detected and FIG. 6B illustrates a state where the sign of locking of the wheels is detected.

DESCRIPTION OF THE PREFERRED EMBODIMENTS

Figure 1:
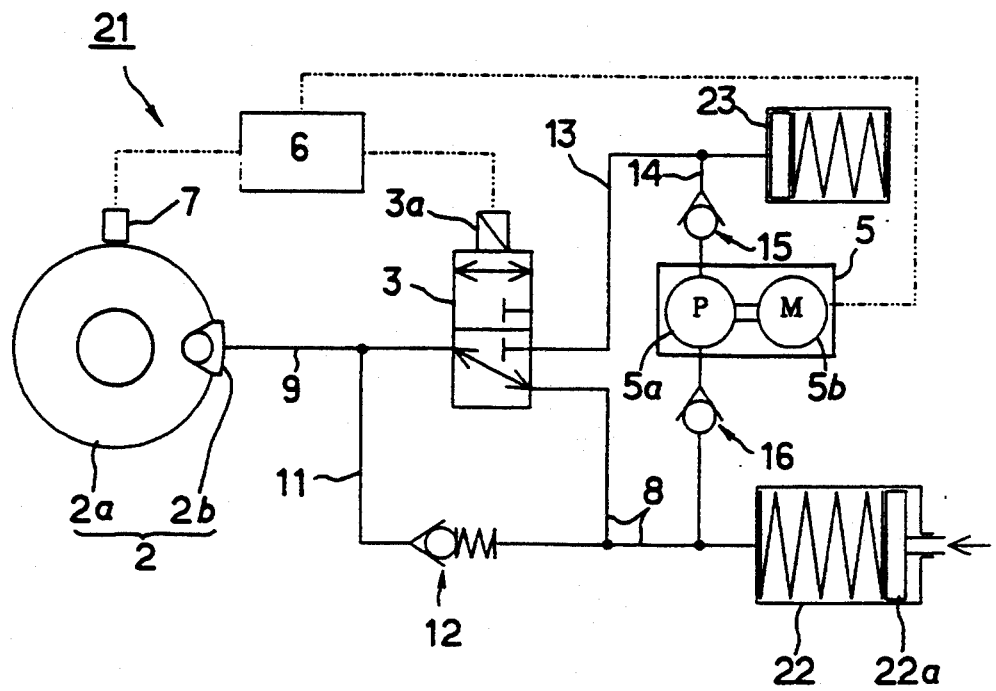
FIG. 1 is a diagram showing a structure of an antiskid braking apparatus of a vehicle according to one embodiment of the present invention, in which no sign of locking of wheels of the vehicle is not detected.

One embodiment of the present invention will now be described with reference to FIGS. 1 and 2.

Since an antiskid braking apparatus 21 according to the present invention essentially comprises the same components as those of the conventional antiskid braking apparatus shown in FIGS. 6A and 6B except for a master cylinder 22 and a pressure reducing cylinder 23, the same reference numerals are given to the same components and their descriptions are omitted here.

According to this embodiment, the capacity of the pressure reducing cylinder 23 is made smaller than the hydraulic pressure discharge capacity which is realized by the full stroke of the master cylinder 22. If the hydraulic pressure discharge capacity of the master cylinder 22 is 1.5 cc for example, the capacity of the pressure reducing cylinder 23 is 0.6 cc to 1.3 cc.

If the pump unit 5 of the antiskid braking apparatus 21 has been broken down and braking is performed in such a manner that the antiskid operation is needed, the antiskid braking apparatus 21 is operated as follows.

If no sign of locking of wheels of a vehicle is detected, the hydraulic oil in the master cylinder 22 is, under pressure, fed to the brake caliper 2b via the fluid passages 8 and 9. The hydraulic pressure causes the brake caliper 2b to hold the disc rotor 2a so that the rotations of the wheels are braked.

Figure 2:
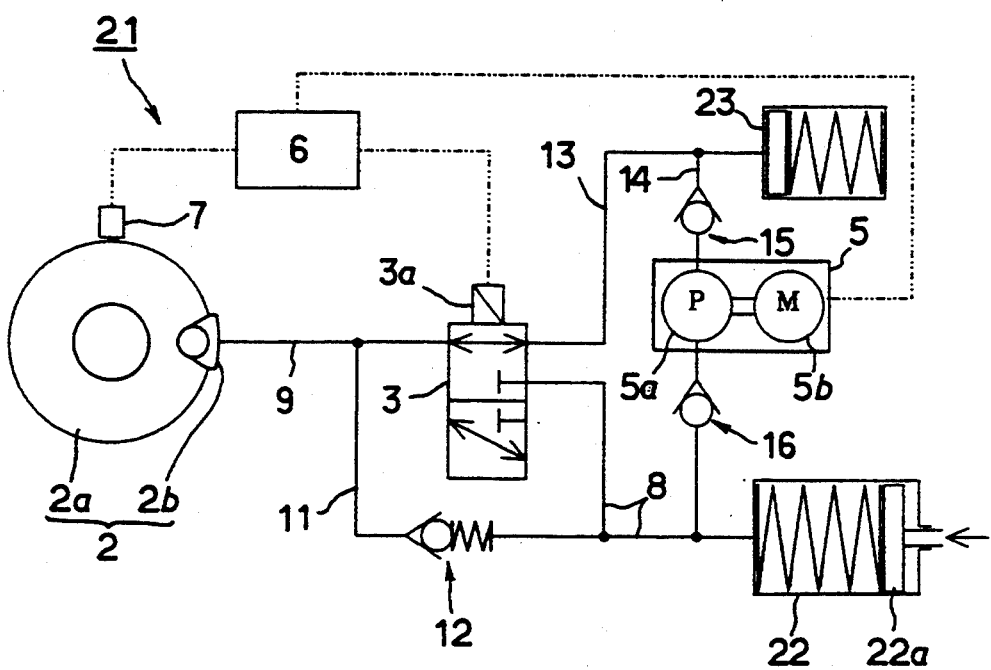
FIG. 2 is a diagram showing a state of the apparatus of FIG. 1 in which the sign of locking of the wheels is detected.

When the control means 6 detects the sign of locking of the wheels in accordance with the input from the wheel-speed sensor 7, the control means 6 operates the solenoid 3a in a usual manner to bring the direction control valve 3 from the state shown in FIG. 1 to the state shown in FIG. 2. As a result, the fluid passage 8 is closed so that the hydraulic oil in the master cylinder 22 is not fed to the brake caliper 2b. Further, the fluid passage 9 and the fluid passage 13 are communicated with each other so that the hydraulic pressure applied to the brake caliper 2b is relieved to the pressure reducing cylinder 23, the hydraulic oil being accumulated in the pressure reducing cylinder 23. Therefore, the force of the brake caliper 2b to hold the disc rotor 2a is relaxed, and accordingly, locking of the wheels is prevented.

The hydraulic oil accumulated in the pressure reducing cylinder 23 is not returned to the master cylinder 22 because the pump unit 5 is broken down. Therefore, the repetition of raising/lowering of the hydraulic pressure applied to the brake caliper 2b causes the hydraulic oil to be fully enclosed into the pressure reducing cylinder 23.

Since the capacity of the pressure reducing cylinder 23 is made smaller than the hydraulic pressure discharge capacity which is realized by the full stroke of the master cylinder 22 as described above, a piston 22a disposed in the master cylinder 22 does not reach its bottom even if the pressure reducing cylinder 23 is filled with the hydraulic oil.

The control means 6 maintains the direction control valve 3 at the state shown in FIG. 1 at the moment the pressure reducing cylinder 23 is filled with the hydraulic oil to cause the hydraulic pressure of the master cylinder 22 to be applied to the brake caliper 2b. Therefore, if the brake pedal or the brake pedal of a vehicle is not then operated again, the braking force similar to that obtainable by a usual braking apparatus can be obtained while eliminating the risk of lengthening the braking distance.

If the pump unit 5 is broken down, the antiskid operation can be achieved for a while as described above. Then, the similar braking force to that obtainable from the usual braking apparatus can be exhibited afterwards. Therefore, the antiskid operation is not interrupted simultaneously with the failure of the pump unit 5. As a result, a driver of the vehicle is given the time to recognize the failure to take any countermeasure.

As described above, the antiskid brake apparatus for a vehicle according to this embodiment of the present invention comprises the master cylinder that receives the brake operation force to operate the braking mechanism as to brake the rotations of the wheels, the wheel-speed sensor for detecting the rotational speed of the wheels, the control means that detects the sign of locking of the wheels in response to the input from the wheel-speed sensor and, if detected the sign, operates the direction-control valve so as to relieve the hydraulic pressure applied to the braking mechanism to the pressure reducing cylinder, and the pump unit that is also controlled by the control means to return the hydraulic oil accumulated in the pressure reducing cylinder to the master cylinder, wherein the capacity of the pressure reducing cylinder is made smaller than the hydraulic pressure discharge capacity which is realized by the full stroke of the master cylinder.

If the pump unit of the antiskid braking apparatus for a vehicle structured as described above is broken down and braking, which necessitates the antiskid operation, is performed, the control means usually repeats the raising/lowering of the hydraulic pressure applied to the brake caliper to prevent the locking of the wheels to accumulate the hydraulic oil in the pressure reducing cylinder.

The hydraulic oil accumulated in the pressure reducing cylinder is not returned to the master cylinder because the pump unit is broken down. Therefore, the pressure reducing cylinder is filled with the hydraulic oil. Since the capacity of the pressure reducing cylinder is made smaller than the hydraulic pressure discharge capacity which is realized by the full stroke of the master cylinder, the piston of the master cylinder does not reach the bottom even if the pressure reducing cylinder is filled with the hydraulic oil.

Therefore, the braking force similar to that obtainable by the usual braking apparatus can be obtained without re-operating the brake pedal or the brake lever after the pressure reducing cylinder has been filled with the hydraulic oil. Therefore, the risk of lengthening of the braking distance can be eliminated.

As described above, if the pump unit is broken down, the antiskid operation can be obtained for a while as described above. Then, the similar braking force to that obtainable from the usual braking apparatus can be exhibited afterwards. Therefore, the antiskid operation is not interrupted simultaneously with the failure of the pump unit. As a result, the passenger of the vehicle is given the time to recognize the failure to take any counter-measure.

Another embodiment of the present invention will now be described hereunder with reference to FIGS. 3 to 5, in which like reference numerals are added to elements or components corresponding to those shown in FIGS. 6A and 6B.

In this embodiment, a pressure cut off valve 122 is specifically arranged between the master cylinder 1, the pump unit 5 and the fluid passage 8, in comparison with the example of FIGS. 6A and 6B.

The pressure cut off valve 122 comprises a cylinder block 123 having an inner hollow portion and a piston 124 disposed inside the cylinder block 123 so as to be slidable vertically, as viewed, with no gap allowed.

An oil chamber 125 is formed between one end surface 124a of the piston 124 and the cylinder block 123. The piston 124 is always and upwardly urged by urging force of a spring 126 elastically held in the oil chamber 125. When the piston 124 is moved downwards, as viewed in FIG. 3, for example, against the urging force of the spring 126, an oil chamber 127 is formed between another end surface 124b of the piston 124 and the cylinder block 123 as shown in FIG. 5.

The oil chamber 125 has a port 128 and a port 129. A fluid passage 131 connected to the master cylinder 1 is connected to the port 128, while a fluid passage 132 joined to the fluid passage 8 connected to the brake caliper 2b is connected to the port 129. Further, the oil chamber 127 has ports 133 and 134. The fluid passage 114 extending from the pump unit 5 is connected to the port 133, while a fluid passage 135 joined to the fluid passage 8 is connected to the port 134. The oil chamber 127 has an air hole 136 communicated with the outside.

The master cylinder pressure from the master cylinder 1 is supplied to the oil chamber 125 through the port 128 to move the piston 124 upwardly. On the other hand, the pump pressure from the pump unit is supplied to the oil chamber 127 through the port 133 to move the piston 124 downwardly.

Figure 3:
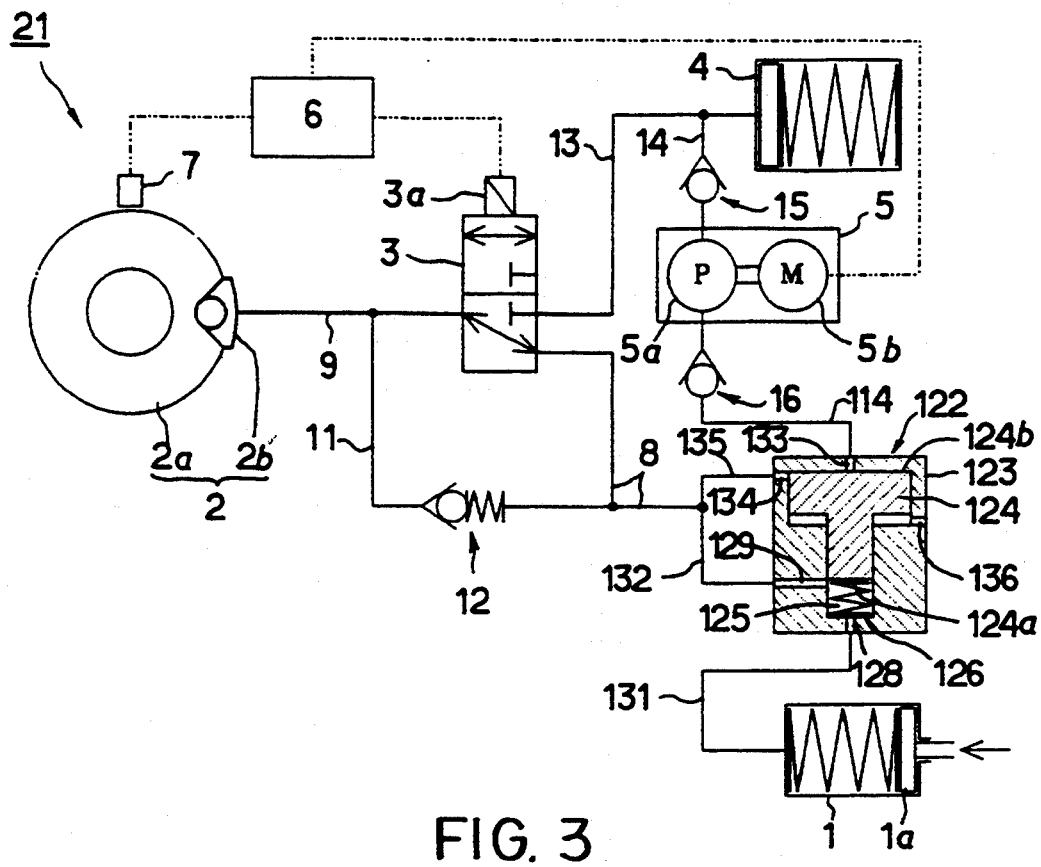
FIG. 3 is a diagram showing a structure of an antiskid braking apparatus according to another embodiment of the present invention in a state where no sign of locking of the wheels is not detected.

In the case where the piston 124 has received the master cylinder pressure and moved upwards as shown in FIG. 3, the oil chamber 127 disappears, the ports 133 and 134 are closed and the port 129 is hence opened. Therefore, the fluid passage 114 connected to the pump unit 5 is closed. Simultaneously, the master cylinder 1 and the brake caliper 2b are connected to each other while interposing the fluid passages 8 and 9. In the case where the piston 124 has received the pump pressure and moved downwards as shown in FIG. 5, the ports 133 and 134 are opened and the port 129 is hence closed. Therefore, the fluid passage 131 connected to the master cylinder 1 is closed. At the same time, the pump unit 5 and the brake caliper 2b are connected to each other while interposing the fluid passages 8 and 9. The air hole 136 is formed for causing the piston 124 to be operated smoothly.

The area of the end surface 124b of the piston 124 that receives the pump pressure is made larger than the area of the other end surface 124a of the same that receives the master cylinder pressure.

The antiskid apparatus 21 constituted as described above is operated as follows.

When the brake pedal or the brake lever of the vehicle has been operated so that the pressure of the master cylinder 1 has been raised, the master cylinder pressure is transmitted to the oil chamber 125 through the port 128 of the pressure cut off valve 122. Since the piston 124 is positioned at an upper position at this time due to the urging force of the spring 126 and the master cylinder pressure, the port 129 is opened and the ports 133 and 134 are closed. Therefore, a state is realized in which the fluid passage 114 connected to the pump unit 5 is closed and in which the master cylinder 1 and the braking mechanism 2 are connected to each other.

Therefore, the master cylinder pressure is not transmitted to the pump unit 5, but the same is transmitted to the brake caliper 2b through the fluid passage 132 and the fluid passages 8 and 9. As a result, the brake caliper 2b is operated so that the rotations of the wheels are braked.

Figure 4:
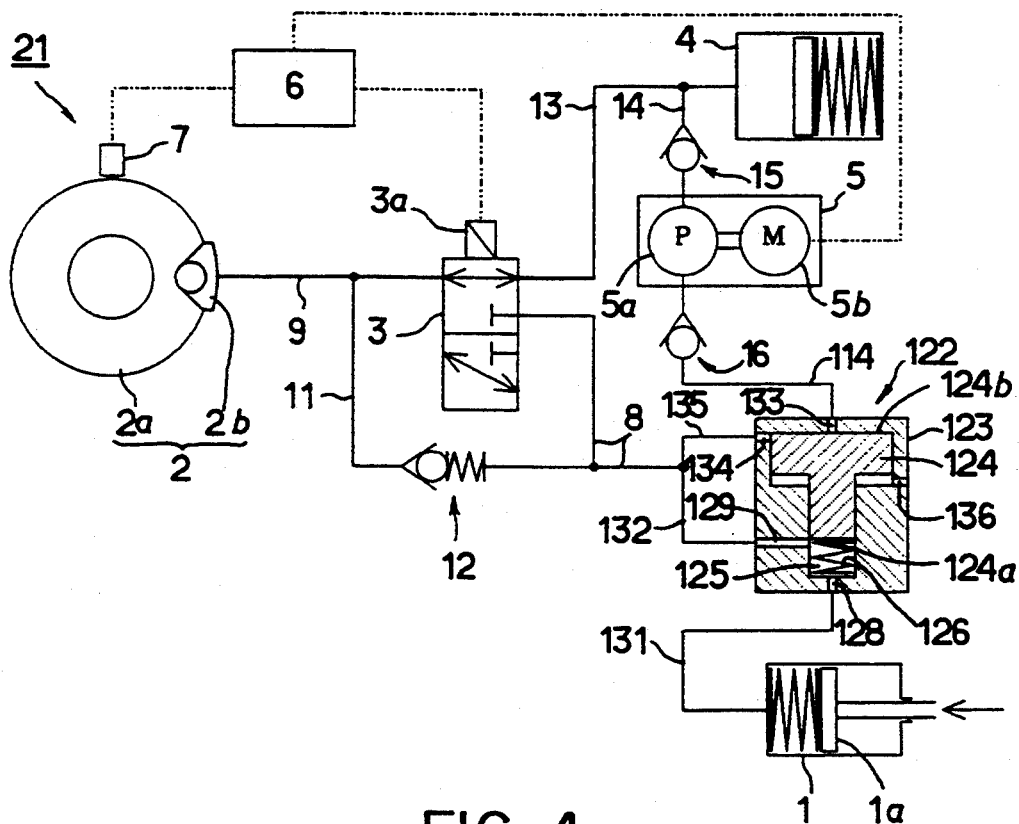
FIG. 4 is a diagram showing the antiskid brake apparatus in a state where the sign of locking of the wheels is detected.

In the case when the control means 6 has detected the sign of locking of the wheels during the braking operation in response to an input from the wheel-speed sensor 7, the control means 6 operates the solenoid 3a to operate the direction control valve 3 from the state shown in FIG. 3 to the state shown in FIG. 4. As a result, the fluid passage 8 is closed so that the master cylinder pressure is not applied to the brake caliper 2b. Further, the fluid passage 9 and the fluid passage 13 are communicated with each other so that the master cylinder pressure applied to the brake caliper 2b is relieved to the pressure reducing cylinder 4. As a result, the hydraulic oil is accumulated in the pressure reducing cylinder 4, and hence, the force of the brake caliper 2b to hold the disc rotor 2a is relaxed, and therefore, locking of the wheels is prevented.

Figure 5:
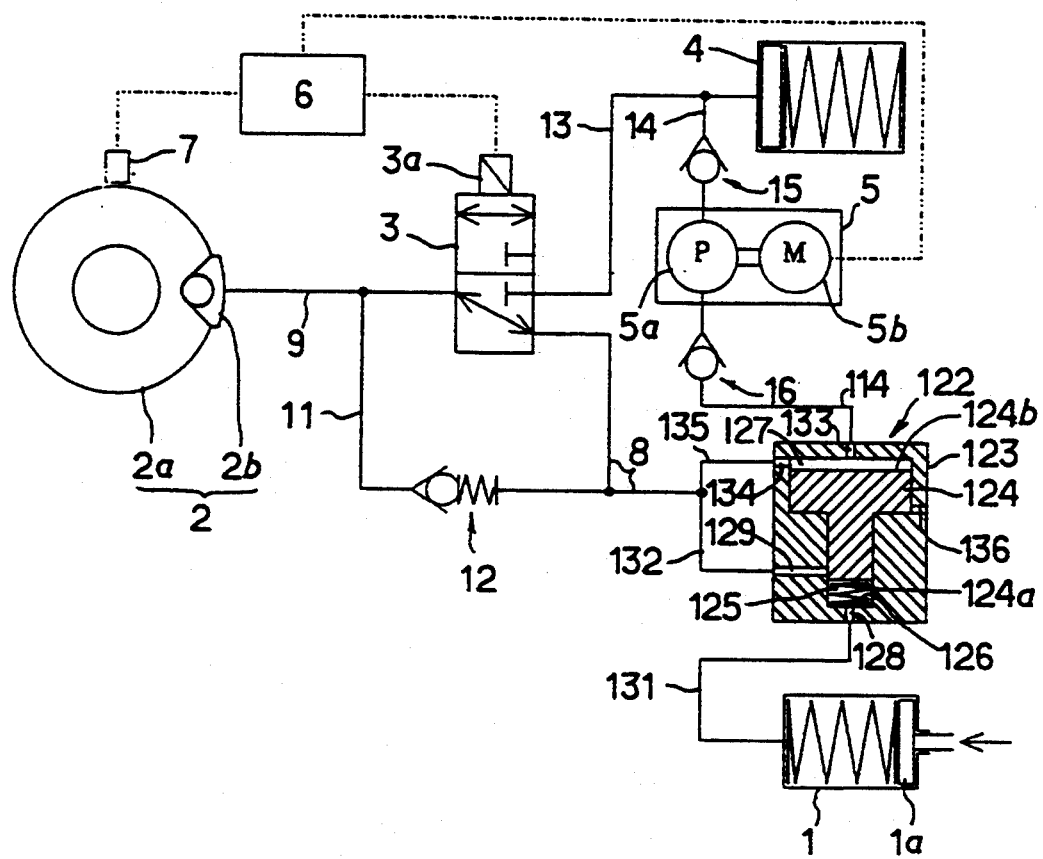
FIG. 5 is a diagram showing the antiskid braking apparatus in a state where the pressure is applied again.

If the sign of locking of the wheels has disappeared, the control means 6 immediately returns the direction control valve 3 from the state shown in FIG. 3 to the initial state shown in FIG. 5 to operate the pump unit 5. Since the pump pressure of the pump unit 5 is applied to the port 133 of the pressure cut valve 122, a state where the pump pressure and the master cylinder pressure are simultaneously applied to the pressure cut off valve 122 is realized.

Since the area of the end surface 124b of the piston 124 provided for the pressure cut off valve 122 that receives the pump pressure is made to be larger than the area of the other end surface 124a that receives the master cylinder pressure, the pump pressure exceeds the master cylinder pressure, causing the piston 124 to be pressed downwards. Therefore, the port 129 is closed, and the ports 133 and 134 are opened so that the fluid passage 131 connected to the master cylinder 1 is cut off. Further, the pump unit 5 and the braking mechanism 2 are connected to each other by the fluid passages 135, 8 and 9.

Therefore, the pump pressure from the pump unit 5 is not applied to the master cylinder 1 but the same is applied to the brake caliper 2b through the oil chamber 127, the fluid passages 135, 8 and 9 so that the brake caliper 2b is pressurized again. The pump pressure at this time is made to take a level that does not lock the wheels in accordance with the results of calculations performed by the control means 6.

According to the antiskid braking apparatus 21 structured as described above, the pump pressure of the pump unit 5 is, by the pressure cut off valve 122, cut off with respect to the master cylinder 1. Therefore, the simultaneous application of the pump pressure and the manual braking force to the master cylinder 1 is prevented, thus preventing the pressure rise in the master cylinder 1 and also preventing the damage of the oil seal and the like. Further, the kickback of the brake pedal or the brake lever can be prevented at the time of the operation of the pump unit 5. As a result, the operation touch can be improved significantly.

Furthermore, the area of one end surface 124b of the piston 124 that receives the pump pressure is made to be larger than the area of the other end surface 124a thereof that receives the master cylinder. Therefore, the piston 124 is able to move easily by the pump pressure when the master cylinder pressure and the pump pressure are simultaneously applied to the pressure cut off valve 122. As a result, the operation of the pressure cut off valve 122 can be made accurate and performed quickly. Hence, the prevention of the rise of the internal pressure of the master cylinder 1 and the prevention of the kickback can further effectively be realized.

As described above, according to this embodiment, the antiskid brake apparatus for a vehicle of the present invention comprises the master cylinder that receives the brake operation force to operate the braking mechanism as to brake the rotations of the wheels, the wheel-speed sensor for detecting the rotational speed of the wheels, the control means that detects the sign of locking of the wheels in accordance with the input from the wheel-speed sensor and, if detected the sign, operates the direction-control valve as to relieve the hydraulic pressure applied to the braking mechanism to the pressure reducing cylinder, and the pump unit that is also controlled by the control means and that returns the hydraulic oil accumulated in the pressure reducing cylinder to the braking mechanism to perform the re-pressurization, wherein the pressure cut off valve is provided which cuts the pump pressure with respect to the master cylinder at the time of the operation of the pump unit.

The antiskid brake apparatus for a vehicle according the present invention is characterized in that the pressure cut off valve is provided with the piston that receives, on the two end surfaces thereof, the master cylinder pressure and the pump pressure, which cuts off the fluid passage connected to the pump unit when the master cylinder pressure is applied thereto to connect the master cylinder and the braking mechanism to each other so that the master cylinder pressure is not applied to the pump unit but the same is applied to the braking mechanism, and that off cuts the fluid passage connected to the master cylinder when the pump pressure is applied thereto to connect the pump unit and the braking mechanism to each other so that the pump pressure is not applied to the master cylinder but the same is applied to the braking mechanism, and the area of the end surface of the piston that receives the pump pressure is made to be larger than the area of the same that receives the master cylinder pressure.

Therefore, when the master cylinder pressure and the pump pressure are simultaneously applied to the pressure cut off valve, the piston is able to move easily by the pump pressure. As a result, the operation of the pressure cut off valve can be made accurate and performed quickly. Hence, the prevention of the rise of the internal pressure of the master cylinder and the prevention of the kickback can further effectively be realized.

Further, although not described in detail hereinabove, it will be easily noted that the first and second embodiments will be easily combined for achieving the effects in both affairs according to the first and second embodiments of the present invention.

What is claimed is:

1. An antiskid brake apparatus for a vehicle comprising:
- a braking mechanism for braking wheels of a vehicle;
- a master cylinder assembly operated in response to a brake operation force and adapted to brake the wheels through the braking mechanism;
- a sensor means for detecting a rotating speed of the wheels;
- a direction control valve means disposed on a fluid passage connecting the master cylinder assembly and the braking mechanism;
- a pressure reducing cylinder assembly which is operatively connected to the direction control valve means and in which hydraulic oil is accumulated;
- a pump means connected through a fluid passage between the master cylinder assembly and the pressure reducing cylinder assembly for returning the hydraulic oil from the pressure reducing cylinder assembly to the master cylinder assembly; and
- a control means for detecting a sign of locking of the wheels in accordance with an input from the sensor means, said control means being operatively connected to the braking mechanism, the direction control valve means and the pressure reducing cylinder assembly,
- wherein the pressure reducing cylinder assembly has a capacity smaller than a hydraulic oil discharge capacity corresponding to a full stroke of the master cylinder assembly.

2. An antiskid brake apparatus according to claim 1, wherein the control means has a structure for operating, if the sign be detected, the direction control valve so as to release a hydraulic pressure applied to the braking mechanism to the pressure reducing cylinder assembly.

3. An antiskid brake apparatus for a vehicle, comprising:
- a brake mechanism for braking wheels of a vehicle;
- a master cylinder assembly operable in response to a brake operation force for braking the wheels through the braking mechanism;
- a sensor means for detecting a rotating speed of the wheels;
- a direction control valve means disposed on a fluid passage connecting the master cylinder assembly and the braking mechanism;
- a pressure reducing cylinder assembly which is operatively connected to the direction control valve means and in which a hydraulic oil is accumulated;
- a pump means connected through a fluid passage between the master cylinder assembly and the pressure reducing cylinder assembly for returning the hydraulic oil from the pressure reducing cylinder assembly to the master cylinder assembly;
- a control means for detecting a sign of locking of the wheels in accordance with an input from the sensor means, said control means being operatively connected to the braking mechanism, the direction control valve means and the pressure reducing cylinder assembly; and
- a pressure cut off valve means operatively connected to the master cylinder assembly and the pump means through fluid passages for cutting off a pump pressure of the pump means with respect to the master cylinder assembly during operation of the pump means, said pressure cut off valve means being operatively connected to the braking mechanism through a fluid passage;
- wherein said pressure cut off valve means comprises a cylinder block having an inner hollow portion and a piston member disposed inside the cylinder block to be slidable, the piston member having two end faces receiving pressures from the master cylinder assembly and the pump means, respectively, the piston member being moved to cut off the fluid passage connected to the pump means when the pressure from the master cylinder assembly is applied to the piston member to connect the master cylinder assembly and the braking mechanism to each other by applying the master cylinder pressure to the braking mechanism and also to cut off the fluid passage connected to the master cylinder assembly when the pressure from the pump means is applied to the piston member to connect the pump means and the braking mechanism to each other by applying the pump pressure to the braking mechanism, and a first end face of the piston member receiving the pump pressure has an area larger than an area of a second end face of the piston member receiving the master cylinder pressure, said piston member being disposed inside the inner hollow portion of the cylinder block with a space as a first oil chamber between the first end face of the piston member and the cylinder block and with a space as a second oil chamber between the second end face of the piston member and the cylinder block in which a spring means is disposed for urging the piston member in a direction to cut off the fluid passage connected to the pump means.

4. An antiskid brake apparatus according to claim 3, wherein the second oil chamber is provided with a first port connected to the master cylinder assembly through the fluid passage and a second port connected to the braking mechanism through the fluid passage and the first oil chamber is provided with a first port connected to the pump means through the fluid passage and a second port connected to the braking mechanism through the fluid passage.

5. An antiskid brake apparatus according to claim 4, wherein the first oil chamber is provided with an air port communicated to an external side.

* * * * *